(12) United States Patent
Urban et al.

(10) Patent No.: US 7,826,043 B1
(45) Date of Patent: Nov. 2, 2010

(54) OPTICAL LEAK DETECTION INSTRUMENT

(75) Inventors: John P. Urban, Binghamton, NY (US); Sam Cucci, Binghamton, NY (US); Jeremy Purdom, Binghamton, NY (US); John Gosart, Hallstead, PA (US)

(73) Assignee: Photonix Technologies, Inc., Endicott, NY (US)

( * ) Notice: Subject to any disclaimer, the term of this patent is extended or adjusted under 35 U.S.C. 154(b) by 190 days.

(21) Appl. No.: 12/152,701

(22) Filed: May 15, 2008

(51) Int. Cl.
*G01N 21/00* (2006.01)
(52) U.S. Cl. .................................... 356/73.1
(58) Field of Classification Search .............. None
See application file for complete search history.

(56) References Cited

U.S. PATENT DOCUMENTS

| | | | |
|---|---|---|---|
| 5,138,690 A | 8/1992 | Cox | |
| 6,069,689 A | * 5/2000 | Zeng et al. | 356/73 |
| 6,381,011 B1 | 4/2002 | Nickelsberg et al. | |
| 6,879,741 B2 | 4/2005 | Salerno et al. | |
| 7,245,800 B1 | 7/2007 | Uhlhorn | |

* cited by examiner

*Primary Examiner*—Tu T Nguyen
(74) *Attorney, Agent, or Firm*—Mark Levy; Hinman, Howard & Kattell (57) ABSTRACT

An optical leak detection instrument. An electromagnetic source is provided for generating an electromagnetic signal. An interface allows the instrument to communicate with a system under test. A portion of the instrument is provided for receiving the electromagnetic signal. A switch is operatively connected to the electromagnetic source for initiating propagation of the electromagnetic signal. Optionally, a handle is operatively connected to the instrument.

35 Claims, 9 Drawing Sheets

OPTICAL LEAK DETECTION INSTRUMENT

FIELD OF THE INVENTION

The present invention relates generally to fault location in fiber optic systems, and more specifically, to an optical leak detection device employing an optical transmitter, a synchronous receiver, an optical filter, and indicators to permit the troubleshooting of optical fiber systems.

BACKGROUND OF THE INVENTION

The development and implementation of fiber optics has radically changed the world. Using fiber optics, data, voice and video information can be digitized, transmitted and received almost instantly throughout the world. With the development of fiber optics, transmission speeds are typically limited only by the speed and capacity of the sending and receiving means. At the same time, the optical fiber used in fiber optic systems is more reliable and more secure than traditional copper transmission lines. While the use of optical fiber for signal transmission has many advantages, the costs associated with the installation and maintenance of optical links can be significant, particularly when compared to copper links. This is often due to the lack of effective diagnostic tools for troubleshooting optical fiber systems.

A basic fiber optic system comprises three main components: a transmitter, a transmission medium, and a receiver. A fiber optic transmitter converts an electrical signal to a light signal, which is subsequently emitted from the transmitter. The light signal is typically within the non-visible spectrum such that there is no visible indication to anyone proximate the fiber optic system that signal is present. The transmission medium carries the light signal from the transmitter to the receiver. The receiver converts the light signal into an electrical signal. While the concept of a basic fiber optic system is easy to envision, actual installation and troubleshooting of a fiber optic system can be a complex and expensive process.

Optical fiber is generally constructed in a core and cladding configuration where two dissimilar types of glass are drawn together in a single strand. Because of the differences in the two types of glass, light entering the core of the strand will propagate along the strand by means of reflection until it reaches the far end of a strand or encounters a fault. While optical fiber, a glass strand generally 125 µm in diameter, can be a delicate structure, it tends to be robust in practical application because it is protected by a polymer buffer and up to several layers of jacketing.

The robust buffer and jacket design of commercial fiber optic cables virtually eliminates problems within the cable itself. Instead, the vast majority of problems occur in or near a patch cabinet or a splice enclosure where the cable is stripped away and handling of individual strands must occur.

Discussion of Related Art

As the light (or, more generally, electromagnetic energy) used in fiber optic communication systems is often non-visible, the precise location of a fault is not readily apparent. While existing quantitative test instruments such as optical time domain reflectometers (OTDRs) and loss test sets can locate damaged fibers and fault locations to within a few meters, this level of macroscopic accuracy does not permit the resolution of problems. Such accuracy can isolate a problem to a specific cabinet or splice enclosure but cannot determine where exactly inside a given enclosure the error has occurred.

U.S. Pat. No. 6,381,011 for OPTICAL FAULT LOCATOR, by Nickelsberg et al., granted Apr. 30, 2002 discloses a handheld optical fault locator used to determine the distance to a discontinuity in a fiber optic cable, such as a break, nick, cut, scrape, indentation, or the like, a splice, a connector, or the end of the cable. The locator includes an analog front end, a complex programmable logic device (CPLD), a laser diode and drive, a microcontroller, at least one input, and at least one output.

U.S. Pat. No. 6,879,741 for SAMPLING END FOR FIBER OPTIC PROBE, by Salerno et al., granted Apr. 12, 2005 discloses a fiber optic probe device having a sampling end positionable over optical fibers. The sleeve could be releasably attached to the fiber optic probe device. A sample chamber including a reflective surface can be formed at the distal end of the sampling end.

U.S. Pat. No. 7,245,800 for FIBER OPTIC INTERCONNECT WITH VISIBLE LASER INDICATOR AND FAULT DETECTOR, by Uhlhorn, granted Jul. 17, 2007 discloses an optical transmission system for transmitting optical data. An optical transmitter, an optical receiver and a transmission medium capable of providing a visual indication of transmission status as well as the location of potential faults within the transmission medium are provided in the detector. The optical transmitter supplies a first nonvisible light source for transmitting optical data and a second visible light source providing a visual indication of transmitter operation and possible faults. The first nonvisible light source and the second visible light source are transmitted across the transmission medium whereby they are received by the optical receiver. The optical receiver includes a filter member for removing the visible light source prior to converting the second visible light source into an electrical signal.

U.S. Pat. No. 5,138,690 for FIBER IDENTIFIER, by Cox, granted Aug. 11, 1992 discloses a fiber identifier for detecting the presence or absence of an active data signal or a test signal in an optical fiber. The instrument includes a piston which positions a portion of the fiber under test against, an optical detector, the piston being located within a housing, and the housing being attached to a drive rod. The rod is responsive to a levered actuation mechanism, but a damper controls the movement rate of the rod, and hence the piston, to bend the fiber. A spring within the housing is used to limit the pressure applied by the piston against the optical fiber. The housing also includes electrical contacts to sense the position of the piston and, indirectly, the position of the rod.

While existing technology can find optical faults in specific circumstances, it would be advantageous to employ a leak detection probe system with a more highly selective and sensitive receiver to detect light leakage from a majority of the aforementioned faults. It would be of further advantage to employ a leak detection probe system which does not require physically handling delicate optical fibers. It would be yet of further advantage for such a probe system to utilize the non-visible light for which a typical fiber system is designed. Moreover, it would be advantageous to employ a visible and/or audible element within the leak detection probe system to indicate the presence of optical energy of interest or the presence of energy leakage due to faults.

It is therefore an object of the invention to provide a handheld optical leak detection instrument containing both an optical receiver circuit and optical emitter in a single probing device.

It is another object of the invention for the probe device to utilize its own source timing to permit a synchronized detection of the source signal for high sensitivity and rejection of ambient light.

It is yet another object of the invention for the source portion of the probing device to be attached to a fiber optic cable and the receiver portion to be used to scan the cable for leakage.

It is yet another object of this invention for the probing device to have a narrow or tapered detection tip to allow users to locate a light leak in small areas such as those encountered in a fiber optic splice or break-out enclosure.

It is yet another object of the invention for the probing device to work with any wavelength of electromagnetic energy, including visible light, or any form of photodetector.

It is yet another object of the invention for the probing device to utilize a tethered or detachable fiber optic wand to couple light to the receiver circuitry.

It is yet another object of the invention for the probing device to include lenses or fiber coupled devices in order to make its sensing tip narrower.

It is yet another object of the invention for the probing device to have two components with optically or electronically tethered source and receiver units sharing timing signals.

It is yet another object of the invention for the probing device to have two components with RF linked source and receiver circuits sharing timing signals.

It is yet another object of the invention for the probing device to be compatible with a cellular telephone, radio, or network interface, allowing the reception of receiver timing signals from a remote source.

It is yet another object of the invention for the probing device to employ asynchronous detection schemes using the same receiver circuitry.

It is yet another object of the invention for the probing device to have optical or electrical filtering in addition to the synchronized detection.

It is yet another object of the invention for the probing device to incorporate an audio and/or visual indicator indicating the presence of leakage.

It is yet another object of the invention for the output of the probing device to be a numeric display indicating actual detected power levels.

It is yet another object of the invention, for the output of the probing device to be a calibrated pass/fail indication.

It is yet another object of the invention for the probing device to incorporate a variable intensity lamp at the detection tip in order to illuminate fault locations as they are detected.

It is yet another object of the invention for the probing device to incorporate adjustable gain.

It is yet another object of the invention for the probing device to incorporate interchangeable heads to allow for different optical filtering or lens configurations.

SUMMARY OF THE INVENTION

In accordance with the present invention, there is provided an optical leak detection instrument. An electromagnetic source is provided for generating an electromagnetic signal. An interface allows the instrument to communicate with a system under test. A portion of the instrument is provided for synchronously or asynchronously receiving the electromagnetic signal. A switch is operatively connected to the electromagnetic source for initiating propagation of the electromagnetic signal. Optionally, a handle is operatively connected to the instrument for ease of handling and to reduce the likelihood of interference with active optical fibers.

The present invention addresses the aforementioned needs. An optical receiver can provide a visual and/or audible indication of the presence of non-visible optical radiation thereby indicating the presence of faults in a fiber link, optical tracer signals, or live data. The inventive instrument comprises a synchronous/asynchronous receiver and synchronous energy source. The receiver is capable of detecting either an internally generated and synchronously modulating signal, an externally generated and modulating tracer signal, and/or light signals carrying communication data. The present invention also includes electronic and field changeable filtering to further differentiate electromagnetic signals of interest from ambient noise signals.

The synchronous nature of the internal energy source and receiver pair and the ability to directly connect that synchronous source to optical systems while probing occurs will permit local fault finding sensitivity advances of up to three orders of magnitude over existing technology while maintaining the same level of noise immunity. The field changeable nature of the optical filtering further permits a unique ability to detect specific asynchronous data channel activity in wavelength division multiplexed fiber networks.

BRIEF DESCRIPTION OF THE DRAWINGS

A complete understanding of the present invention may be obtained by reference to the accompanying drawings, when considered in conjunction with the subsequent detailed description, in which.

For the sake of clarity and brevity, like elements and components of each embodiment may bear the same designations throughout the description.

DESCRIPTION OF THE PREFERRED EMBODIMENT

The present invention features a novel way of quickly and precisely locating optical cable faults and light leakage areas which are not easily detectable with current fault locating technology. In a first embodiment, the instrument comprises a fiber optic diagnostic reception apparatus for providing an indication of a fault location along a fiber optic path. The fiber optic diagnostic reception apparatus includes a receiver having a detector and filter circuitry and a synchronized light source, wherein the detector captures non-visible light for analysis. Results of the analysis are a combination of visible and audible indications made available to the user.

Figure 1:
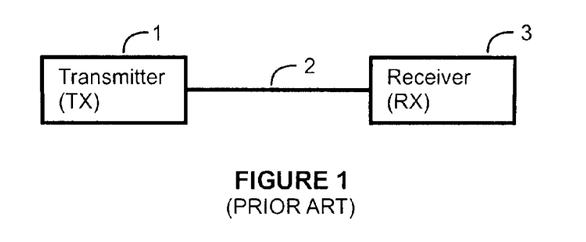
FIG. 1 illustrates a fundamental fiber link of the prior art.

Referring now to FIG. 1, there is shown a basic transmitter 1 and receiver 3 schematic diagram of fiber optic operations over an optical fiber or transmission medium 2, well known in the prior art. Transmitter 1 converts an electrical signal to an electromagnetic signal and receiver 3 reverses the conversion to an electrical signal.

Figure 2:
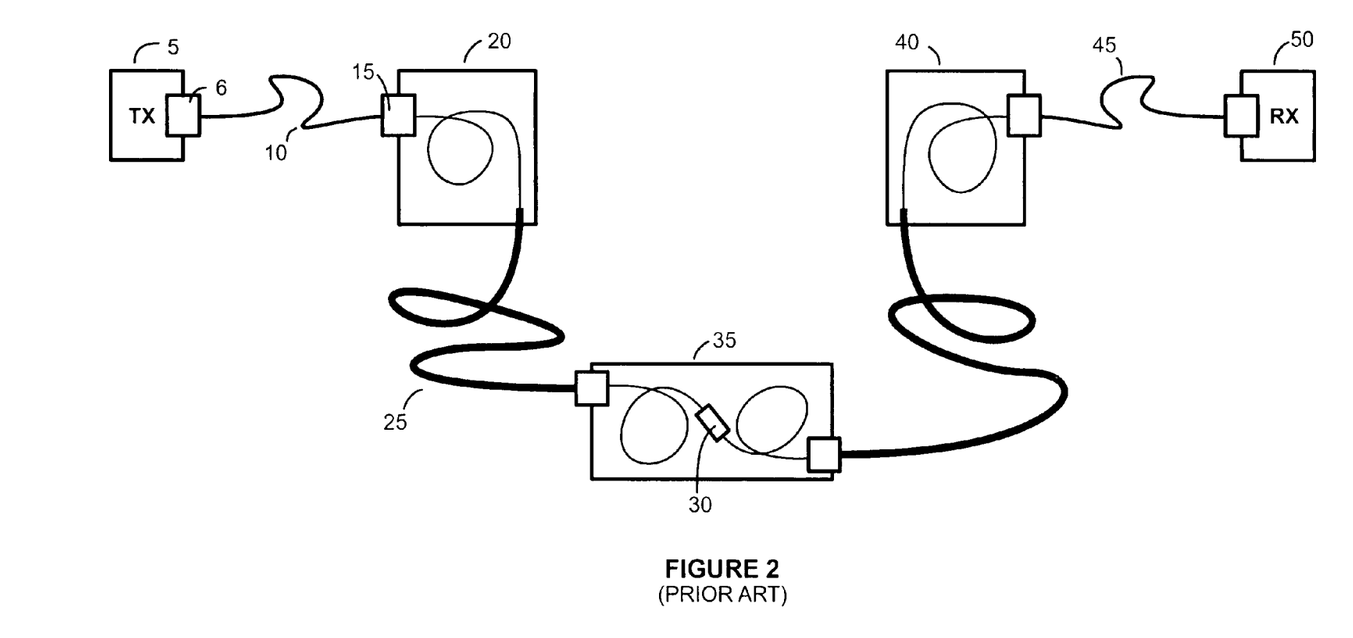
FIG. 2 illustrates the basic mechanical structures of a fiber link of the prior art.

An in-depth representation of a physical fiber optic link is shown in FIG. 2. It consists again of a transmitter 5 which emits light via connector assembly 6 into fiber optic cord 10, which is attached to a patch cabinet 20 by way of a connector and adapter assembly 15. The cabinet may house hundreds of connector assemblies, splices, and strands of fiber coming from a main trunk cable 25. Over distance, a trunk cable may need to be constructed of several cables which are joined by splices 30 housed in a splice enclosure 35. At the far end of the link, there is a second patch cabinet 40 and cord 45 before reaching the receiver 50.

Figure 3:
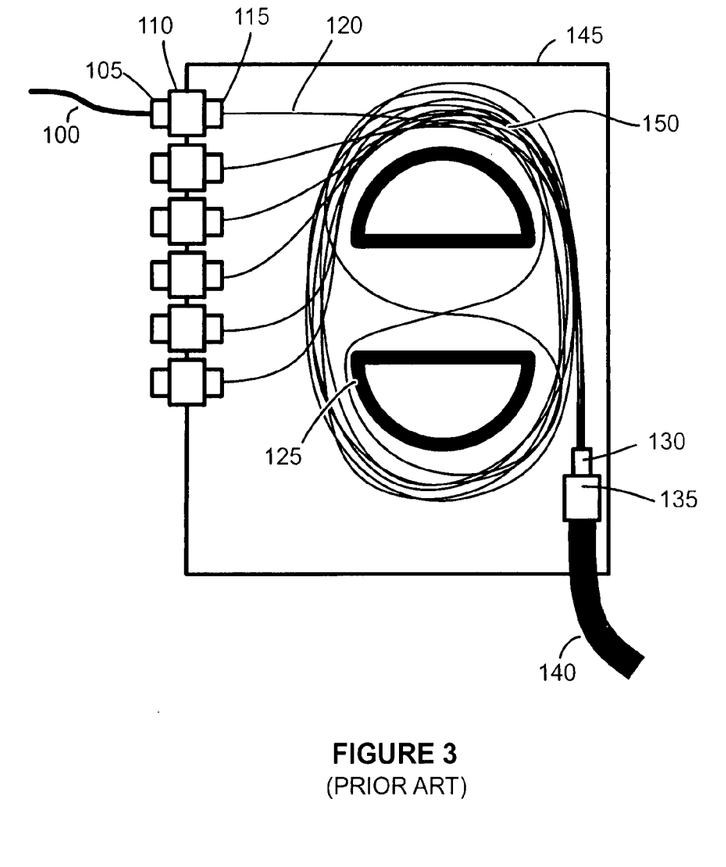
FIG. 3 illustrates patch panel mechanical structures and fault points of the prior art.

A detailed view of a patch cabinet 145 in FIG. 3 better exemplifies the level of accuracy required in the location and repair of faults. Light entering the cabinet 145 via patch cord 100 must pass through patch connector 105, through a bulkhead adapter 110, through a trunk connector 115, before entering a strand of trunk fiber 120. The fiber will generally wrap over a management mandrel 125, pass through a fan-out device 130, and enter a cable through a breakout point 135 in the trunk cable 140. Since a bend or fracture may occur at any of these locations within or near the patch cabinet 145, and since repair costs between these locations may vary by several orders of magnitude, it is critical to have fault isolation capability on the order of centimeters as opposed to meters. A similar mechanical configuration exists in most splice enclosures thereby creating the same cost of repair concerns but with the additional factors of high labor cost and repair time due to physical location issues. To date, only three types of leak indication or detection device have been available for this type of fault location, the fiber identifier, the infrared light probe, and the visible fault locator.

Figure 4:
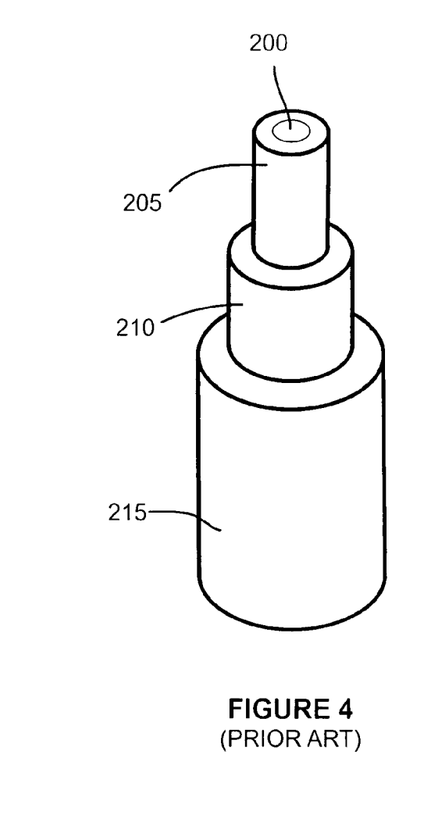
FIG. 4 illustrates the structure of an optical fiber of the prior art.

Referring now to FIG. 4, there is shown a perspective cutaway schematic view of the structure of optical fiber. A glass core 200 is surrounded by cladding 205 which, in turn, is surrounded by buffer coating 210 and, finally, a jacket 215, all concentrically arranged. Optical fiber cladding 205 is generally covered in a standardized color-coded buffer jacket 215 and visible laser light can be highly attenuated in non-matched color strands. For example, visible fault locator (VFL) devices rarely work well with black, green, brown, and blue colored buffers. In addition, components such as connectors, adapters, and splices often have structures that prevent visible light penetration thereby inhibiting fault detection. These factors limit the usefulness of the device to only a small percentage of potential problems. VFLs also suffer from the results of high attenuation of visible wavelengths in typical communication grade glass, useful operation distances for fault location are generally limited to less than 5 km, a short distance in fiber terms where optical paths can sometimes exceed 100 km. Furthermore, VFLs are often rendered useless in bright ambient light and outdoor conditions because the low level glow from VFL indicated faults simply cannot be seen.

Figure 5:
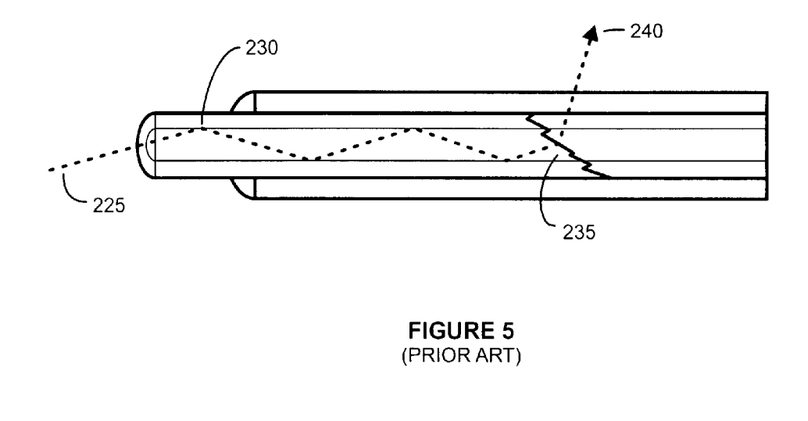
FIG. 5 is a section view of a length of broken optical fiber of the prior art.
Figure 6:
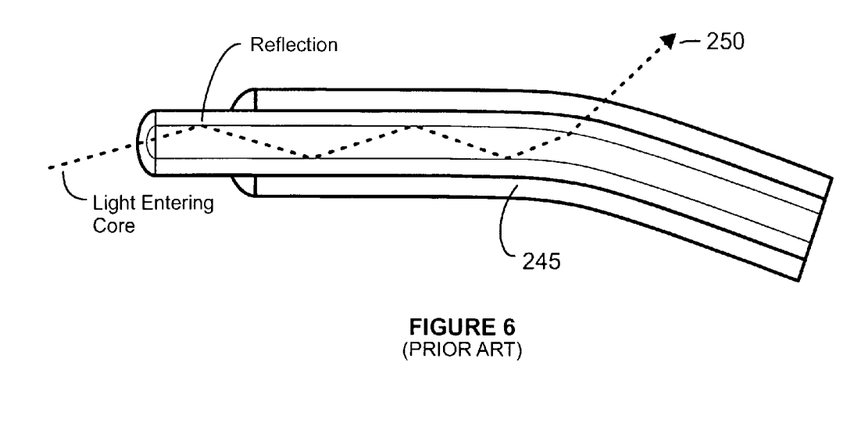
FIG. 6 is a section view of a length of bent optical fiber of the prior art.

Referring now to FIGS. 5 and 6, there are shown section views of a broken and a bent optical fiber, respectively, of the prior art. After optical fiber is installed, a variety of fault conditions may either exist or develop over time whereby the optical path may be degraded or broken entirely. The optical fiber may be broken, bent, damaged, crimped, cut, incorrectly routed while connectors or splice junctions may be damaged or poorly assembled. When a break 235 in an optical fiber occurs, light no longer propagates along the strand but instead refracts from the core glass and escapes at the point of damage 240. The same escape of light may occur when fiber is bent too tightly 245 and the path of light in the core allows it to escape 250. In both circumstances, light is lost and the communication link is either degraded or broken.

Figure 7:
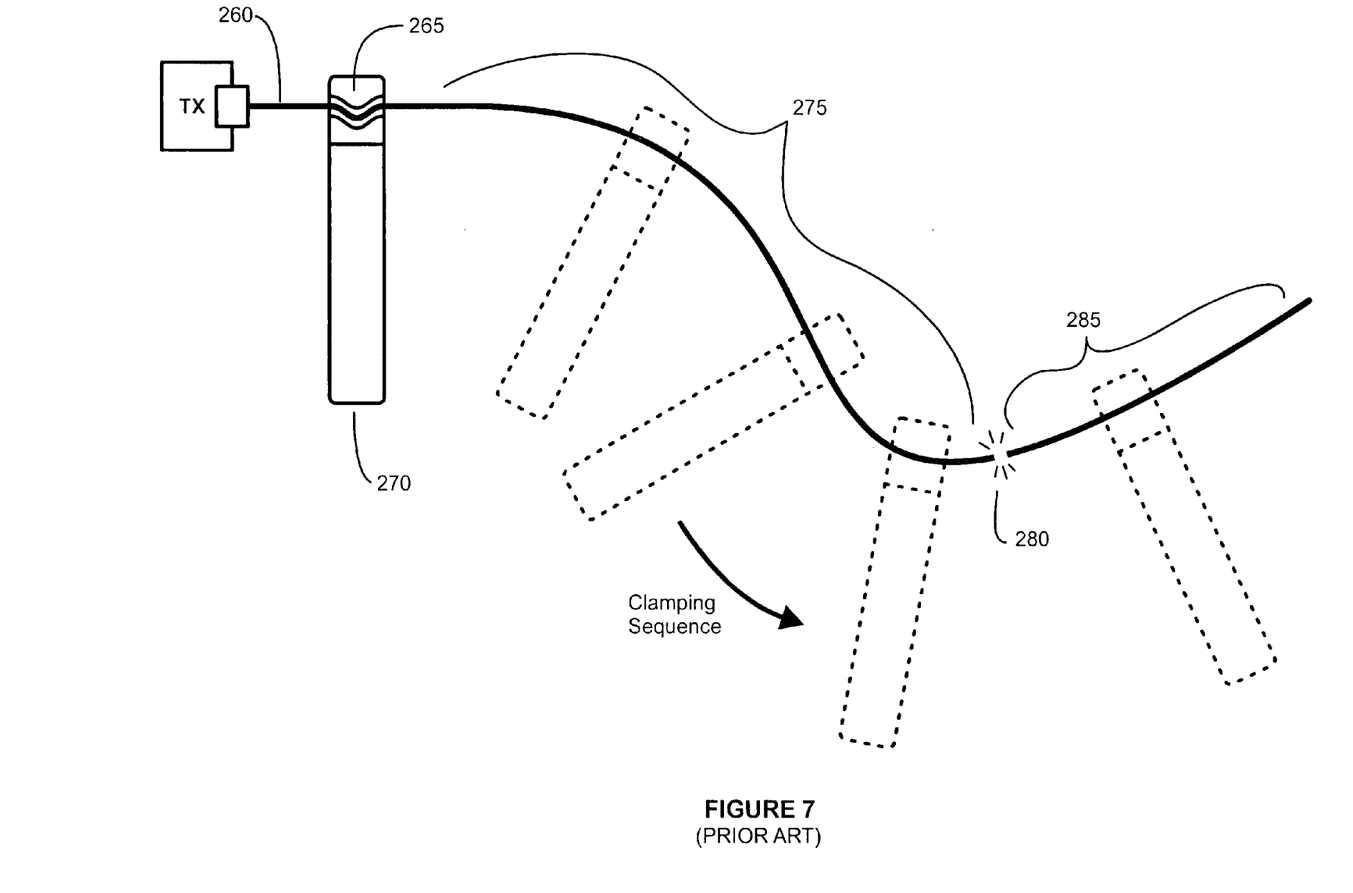
FIG. 7 is a schematic view of a fiber identifier of the prior art.
Figure 8:
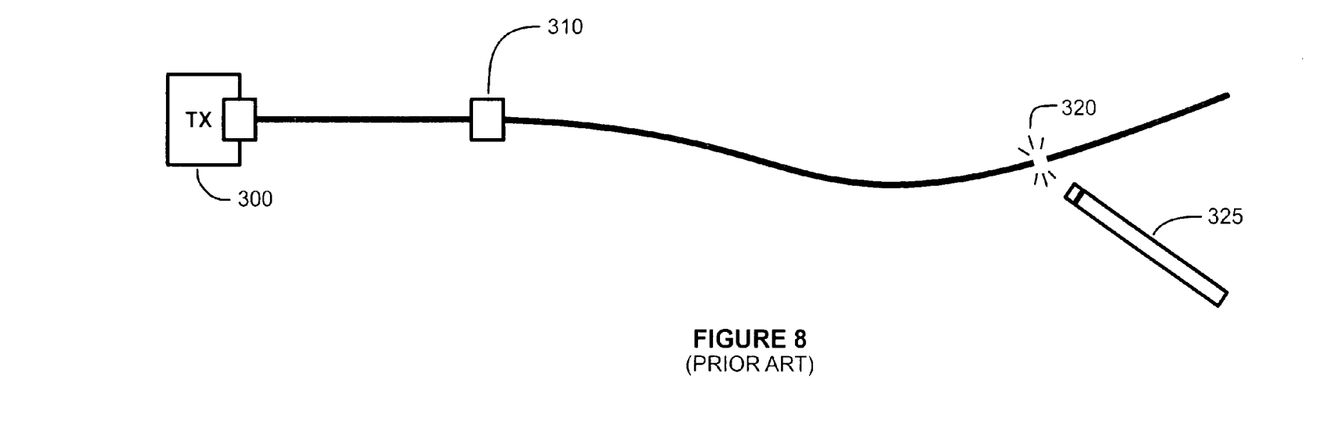
FIG. 8 is a schematic view of an infrared light probe of the prior art.
Figure 9:
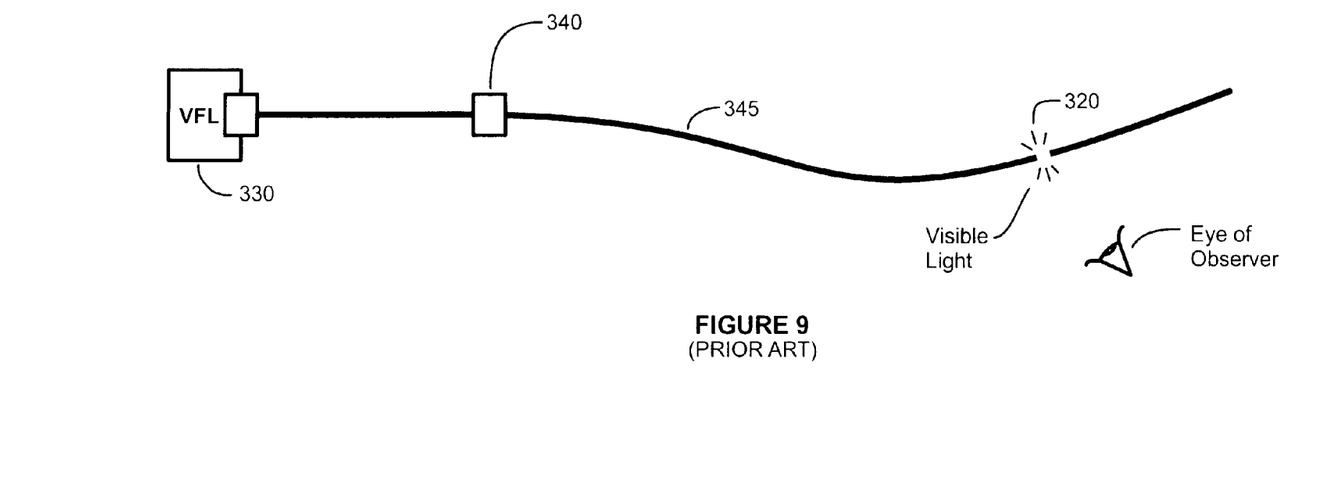
FIG. 9 is a schematic view of a visible fault locator of the prior art.

Referring now to FIGS. 7 through 9, there are shown schematic views of a fiber identifier, infrared light probe, and visible fault locator, respectively, of the prior art.

The fiber identifier 270 utilizes a fiber bending and clamping structure 265 to force light out of a fiber 260 for analysis. Fiber identifiers are sometimes used to indirectly locate a fault by repeatedly clamping a section of fiber to follow an active region 275 of fiber until an inactive region 285 is found thereby indicating presence of a fault 280. Since the patch cabinet represented in FIG. 3 depicts a typical environment, it can be seen that the use of fiber identifiers for fault location can be financially risky and time consuming.

The infrared light probe 325 also has had limited use in the detection of faults and tracing fibers. It is used to search for light leaks 320 from a remote light source 300 attached by connector 310 to a fiber under test. Although capable of detecting infrared emission from transmitters or light sources, current technology probes have the limitation of poor sensitivity which renders them useless in most leak detection applications. Infrared light probes also suffer from interference due to the infrared components of ambient room light and sunlight thereby giving false indications. In addition, as with fiber identifiers, the user often needs to insert the entire hand into the mesh of routed fibers 150 in order to use the device, again a financially risky proposition when working on networks carrying live traffic.

To date, the most viable and popular method for rapid and precise fault location is to attach or otherwise incorporate a visible fault locator (VFL) 330. Typically in the form of a red light emitting laser source, the VFL 330 injects visible light into a fiber system 345 via connector 340 and the user physically looks for visible light emissions to determine fault location 320.

Figure 10:
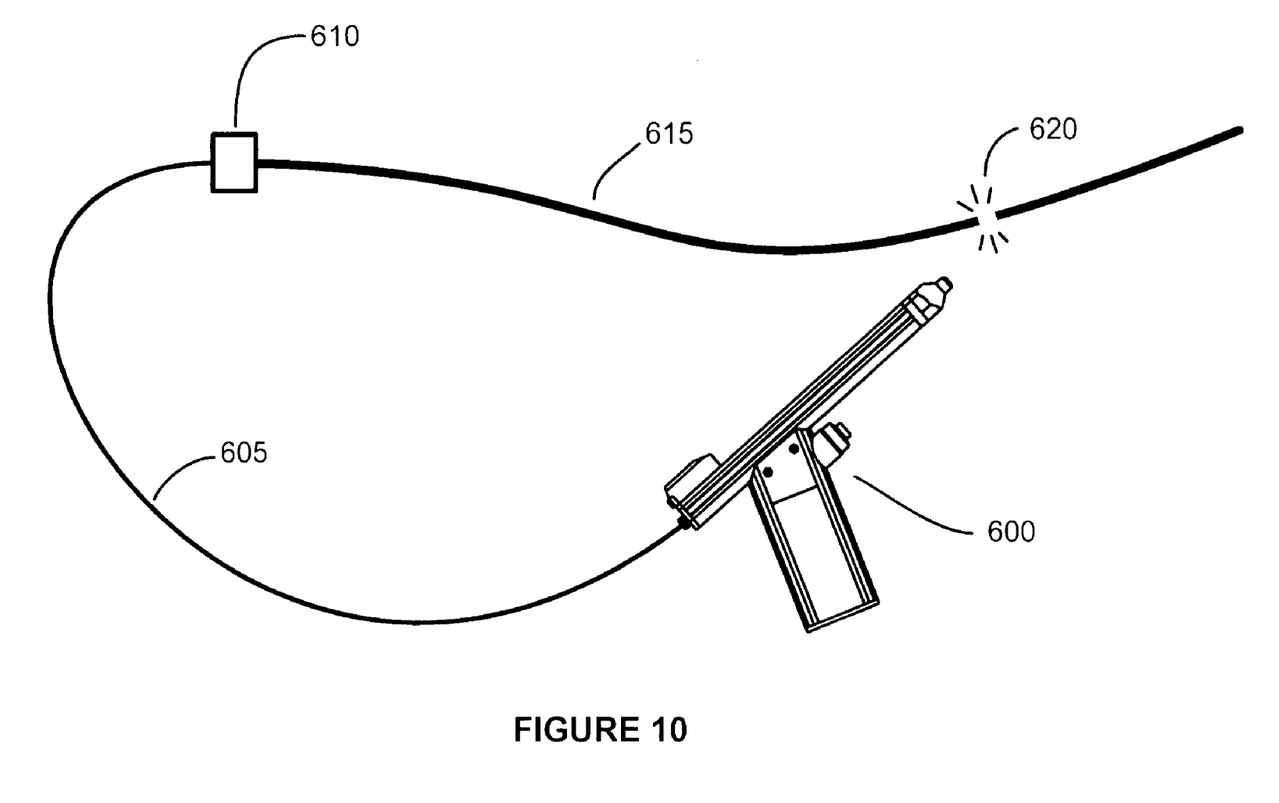
FIG. 10 is a schematic view of an improved fault detection.
Figure 11:
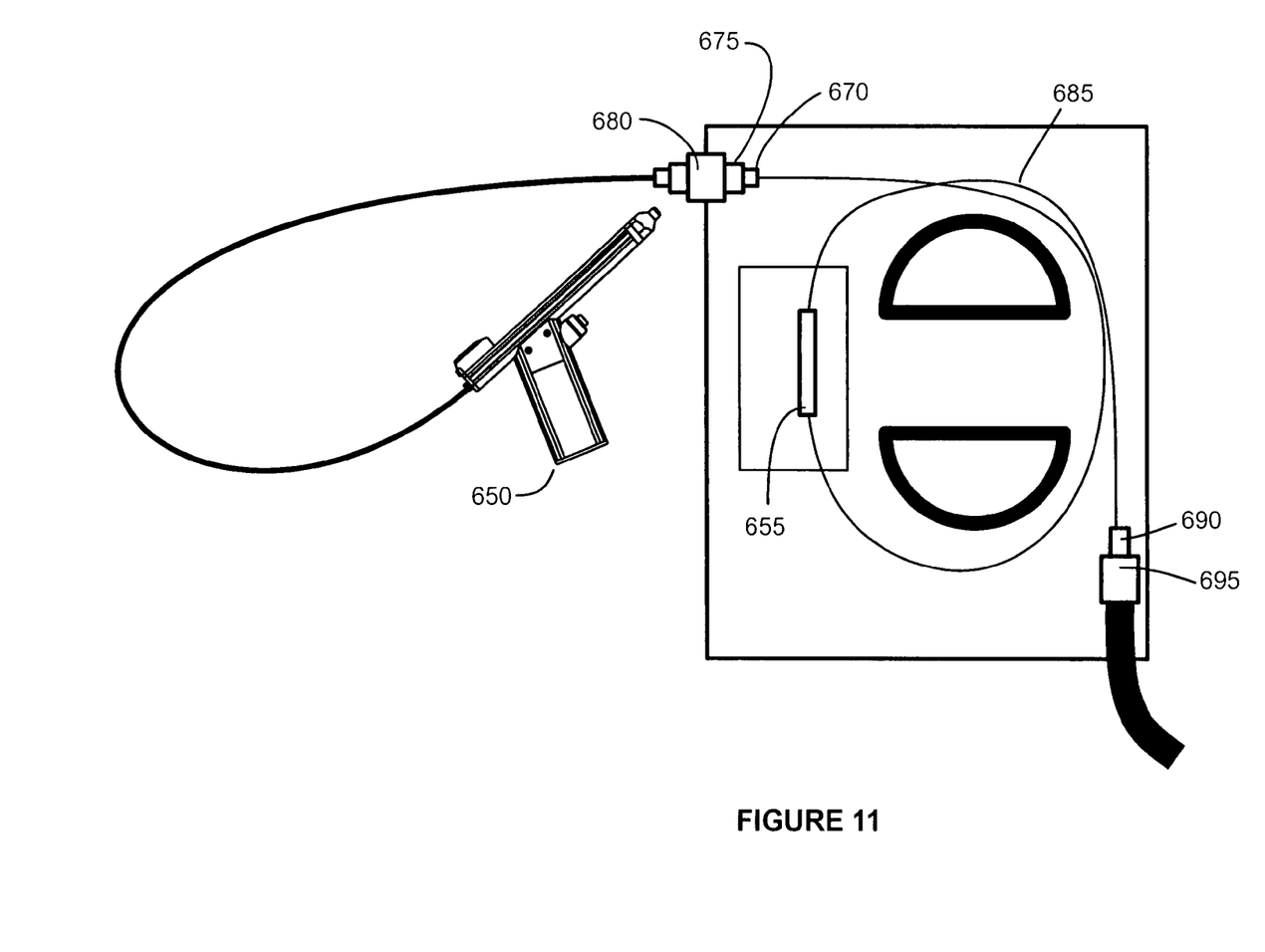
FIG. 11 is a schematic view of the apparatus in accordance with the present invention.

Referring now to FIG. 10, the inventive instrument 600 differentiates between three types of non-visible light: asynchronously modulated light, asynchronously modulated light at a frequency of 2 kHz, and most importantly, 500 Hz synchronously modulated light from the functionally attached light source.

The first mode of operation, standard asynchronously modulated light detection, permits the user to probe fibers, fiber optic devices, and communications equipment for the presence of either remotely generated optical data traffic, tracer signals, or other types of switched light source.

The second mode of operation, asynchronously modulated tone detection, limits detection to only 2 kHz modulated optical signals. The purpose of this additional filtering is to permit fiber path tracing and fault detection with a remote 2 kHz non-visible light source at the exclusion of interfering communication signals. This mode of operation as well as the first mode are similar to existing infrared probe technology.

The third mode of operation embodied in the present invention is synchronously modulated tone detection. As opposed to the prior art methods depicted in FIG. 7-9, in this mode instrument 600 is connected directly to the fiber under test via patch cord 605 and connector interface 610 to the fiber under test 615 and is used to probe for its own synchronized light signal thereby indicating faults 620. This method of utilizing internally generated light is used for the location of faults and light leakage often undetectable by existing devices. In this mode, fiber faults may be located through most buffer colors in 250 um and 900 um buffered fibers and many 3 mm jacked fibers. Light leakage may also be detected through many optical connector bodies 675, connector boots 670, bulkhead adapters 680, splices 655 and near fanout devices 690 as well as cable breakout points 695. Furthermore, in this highly sensitive mode of operation, it is possible to detect the minute light leakage in splices or connectors which are generally considered to be of good quality and from many faults in newer technology bend insensitive fibers.

Figure 12:
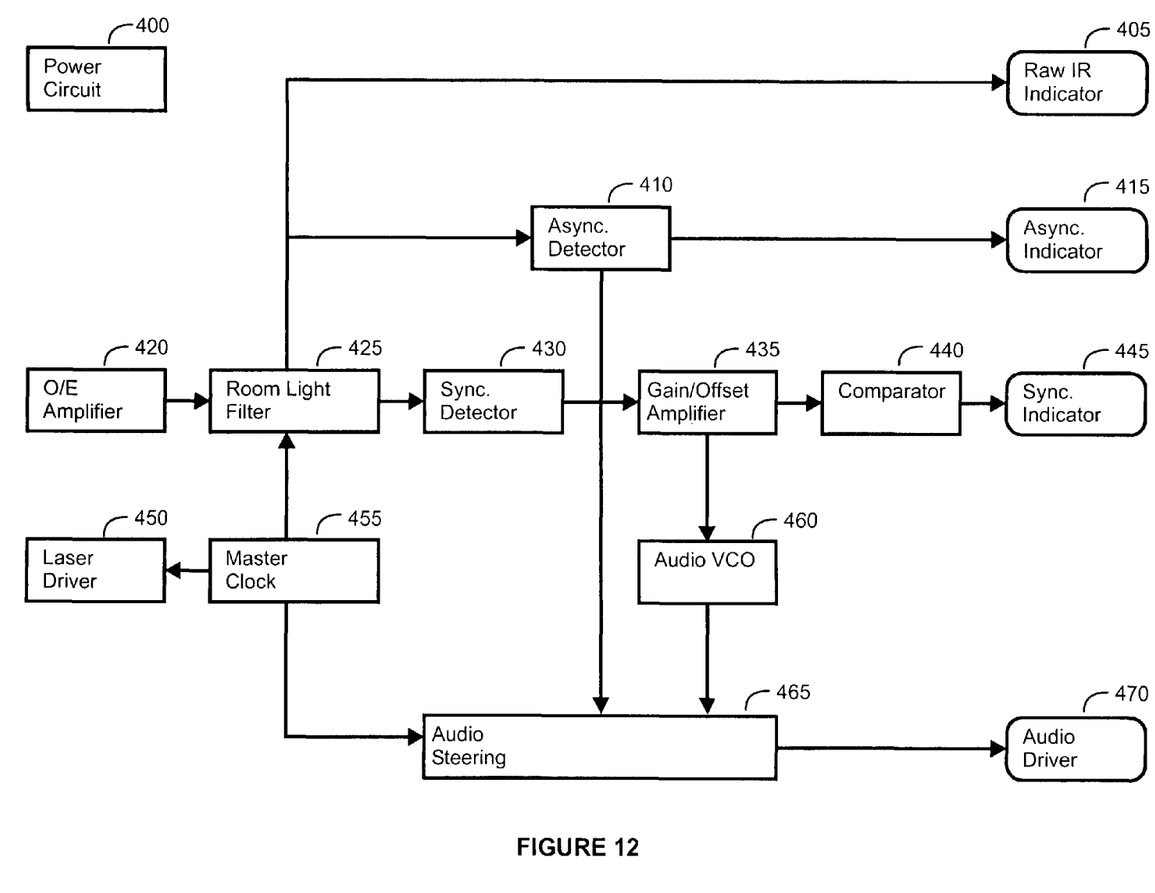
FIG. 12 is block diagram of circuitry in accordance with the current invention.

Referring now to FIG. 12, a circuit diagram shows the internal workings of the inventive handheld optical leak detector. A power circuit 400 draws energy from a 9V unregulated source and supplies the functional blocks with +/−5VDC regulated power. Also included is sense circuitry which monitors a membrane type power on switch and a low battery indicator. Also included is a master clock 455 which provides timing for internal filtering and audio blocks as well as a 500 Hz master pulse train for the internal laser and synchronous detection circuits. An O/E amplifier block 420 consists of a photodiode and amplifier, which generate a voltage variable signal proportional to received light. The block is a high gain transimpedance type amplifier with a frequency response of DC to ~30 kHz.

A room light filter 425 consists of a multiple notch filter which attenuates the fundamental and harmonic light oscillations emitted by standard indoor fluorescent bulbs before further amplification and filtering. A raw IR indicator 405 receives the signal from the room light filter 425, blocks any continuous wave components, and sends the signal to a display device. This signal indicates the presence of modulating infrared light from sources other than room light. An asynchronous detector 410 is a phase locked loop (PLL) device designed to operate at 2 kHz or other desired tracer frequency. Any signal near the PLL center frequency at a magnitude of 1.5 mV or greater will digitally indicate a lock. This digital signal is fed to the asynchronous indicator 415 and an audio steering circuit 465. The asynchronous indicator 415 is a digital of the PLL status fed from the asynchronous detector 410. The asynchronous indicator 415 indicates the presence of remotely modulated optical tracer tones thereby providing a function similar to that of existing infrared leak detection probes.

The critical portion of the circuit, the synchronous detector circuit 430, is a switched gain amplifier that uses pulses from the master clock circuit 455 to pass or invert signals from the room light filter block 425. Since the synchronous detector 430 is phase synchronized with an internal laser driver 450, it provides high noise rejection of all light and electrical signal sources not matching the frequency and phase of the laser output. Synchronous detector 430 also utilizes low pass filtering to complete the detection process. A gain/offset amplifier 435 permits the electrical tailoring of the output from synchronous detector 430 for interface with display and indication components. The gain in this section is user accessible to permit field sensitivity adjustment.

A comparator circuit 440 allows a set point to be established for the indication of synchronous light detection, permitting the calibration of the device to a known quantity of light, thereby allowing pass/fail analysis of devices. Synchronous indicator 445 drives a display to give visual indication of internal laser light detection. An audio voltage control oscillator 460 receives the modified voltage variable output of the gain/offset amplifier 435 and generates an audio tone from approximately 10 Hz to 10 kHz. The pitch of this tone varies with the quantity of light being synchronously detected. An audio steering circuit 465 determines the source of audio output, synchronous detector or asynchronous detector. The audio driver 470 receives low power audio frequency signals from the steering circuit and delivers higher current pulses to a speaker.

A laser driver 450 uses the master pulse train from the master clock 455 to drive an internal laser. The laser output power is internally adjustable and capable of emitting power levels greater than 0 dBm at a wavelength of 1550 nm.

Figure 13:
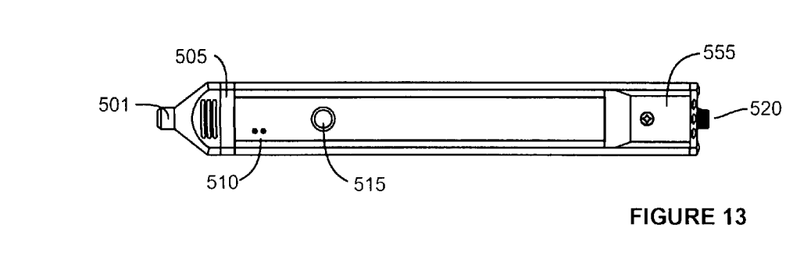
FIG. 13 is a top view of the instrument in accordance with the current invention.
Figure 14:
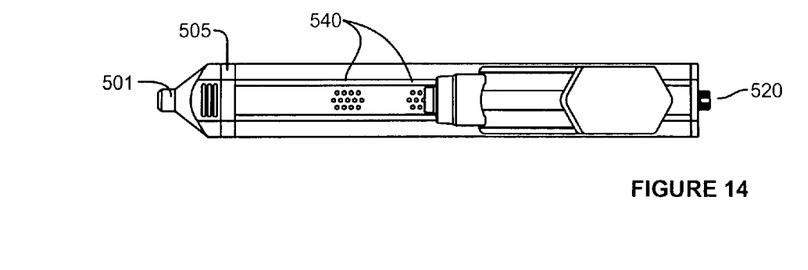
FIG. 14 is a bottom view of the instrument in accordance with the current invention.
Figure 15:
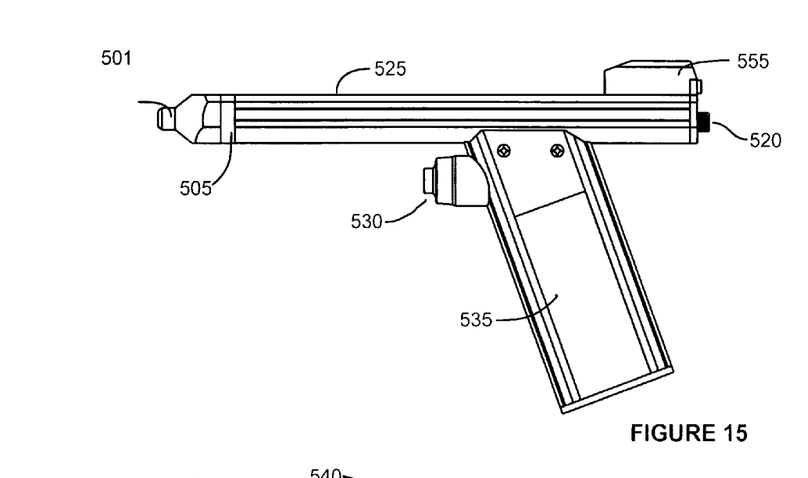
FIG. 15 is a side view of the instrument in accordance with the current invention.

FIGS. 13-16 depict the physical configurations of the inventive instrument. FIG. 15 is a side view of instrument showing the activation trigger 530 that begins the fault location process. The power cell 535 also acts as the device handle to allow ease of use and proper placement of optical module 501 in close proximity to system under test while keeping the hand at a safe distance. The detector head 505 propinquity to the optical module 501 allows the easy alignment of the components. The circuitry diagrammed in FIG. 12 is integrated into the spine of the probe 525 for the purpose of being an all in one tool.

FIG. 13 is a top view of instrument that encompasses the power switch 515 and power status indicators 510.

FIG. 14 is a bottom view of instrument that shows the audio ports 540 that are driven by the audio driver 470. This gives an auditory signal to the operator that the point being searched for has been found.

Figure 16:
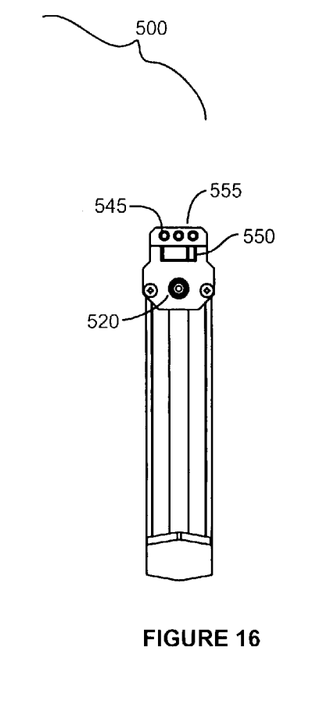
FIG. 16 is a rear view of the instrument in accordance with the current invention.

FIG. 16 is a rear view of instrument that has a sensitivity switch 550 which allows the device responsiveness to be changed easily and while the device is in use. A display module 555 with leakage indicators 545 presents a visual representation of the results found. The laser output port 520 is used to introduce a light signal into the system under test which is phase synchronized to the internal receiver. Light used from the port 520 internally synchronized source permits the device to achieve up to a 1000× increase in sensitivity while maintaining the same level of noise immunity.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An optical leak detection instrument comprising:
 a) a handheld housing;
 b) an electromagnetic source disposed in said housing for generating an electromagnetic signal over an optical fiber;
 c) interfacing means operatively and directly connected to said electromagnetic source for transmitting said electromagnetic signal directly over an optical fiber under test;
 d) means for receiving an electromagnetic signal from said optical fiber under test, said means for receiving being disposed in said housing and operatively connected to said electromagnetic source and operatively connected to said interfacing means; and e) means disposed in said housing for comparing the received electromagnetic signal to the electromagnetic signal.

2. The optical leak detection instrument in accordance with claim 1, further comprising:
   f) switching means operatively connected to said electromagnetic source for initiating propagation of said electromagnetic signal.

3. The optical leak detection instrument in accordance with claim 2, wherein said instrument comprises a handle for holding and manipulating said instrument proximate the metacarpal region of a hand, said handle having a configuration being one of: cylindrical and tapered.

4. The optical leak detection instrument in accordance with claim 1, further comprising:
   f) a handle operatively connected to said instrument.

5. The optical leak detection instrument in accordance with claim 4, further comprising:
   g) a power source disposed in said handle.

6. The optical leak detection instrument in accordance with claim 1, wherein said electromagnetic source comprises at least one from the group: a laser, a light emitting diode, an incandescent lamp, a chopped emitter, and a communication signal.

7. The optical leak detection instrument in accordance with claim 1, wherein said means for receiving said electromagnetic signal comprises:
   f) an interchangeable head.

8. The optical leak detection instrument in accordance with claim 7, further comprising:
   g) filtering means disposed in said head.

9. The optical leak detection instrument in accordance with claim 1, wherein said instrument comprises a longitudinal body to facilitate access to restrictive three dimensional Euclidean-space environment and prevent entanglements therein.

10. The optical leak detection instrument in accordance with claim 1, further comprising:
   f) a modular apparatus operatively connected to said means for receiving an electromagnetic signal.

11. The optical leak detection instrument in accordance with claim 10, wherein said modular apparatus comprises a detection indicator for alerting a user of presence of said received electromagnetic signal.

12. The optical leak detection instrument in accordance with claim 11, wherein said detection indicator comprises at least one of the group: visible indicator, audible indicator, and tactile indicator.

13. The optical leak detection instrument in accordance with claim 1, wherein said an electromagnetic source, said interfacing means, and said means for receiving said electromagnetic signal are disposed in a single physical package.

14. The optical leak detection instrument in accordance with claim 1, wherein said electromagnetic signal generated by said electromagnetic source and said electromagnetic signal received by said means for receiving said electromagnetic signal are chosen from the group: synchronous and asynchronous.

15. A handheld optical leak detection instrument comprising:
   a) a longitudinal frame having a proximal end and a distal end;
   b) means proximate said proximal end of said frame for generating an electromagnetic signal and interfacing with an optical fiber under test; and
   c) a head attached to said distal end of said frame for receiving an electromagnetic signal, said head being operatively connected to said means for generating an electromagnetic signal and interfacing with an optical fiber under test.

16. The handheld optical leak detection instrument in accordance with claim 15, further comprising:
   d) switching means for initiating propagation of said electromagnetic signal.

17. The handheld optical leak detection instrument in accordance with claim 15, further comprising:
   d) a handle connected to said frame.

18. The handheld optical leak detection instrument in accordance with claim 17, further comprising:
   e) a power source disposed in said handle.

19. The handheld optical leak detection instrument in accordance with claim 17, wherein said handle has a configuration being one of: cylindrical and tapered.

20. The handheld optical leak detection instrument in accordance with claim 15, wherein said head is interchangeable.

21. The handheld optical leak detection instrument in accordance with claim 15, wherein said electromagnetic signal generated by said means for generating an electromagnetic signal and said electromagnetic signal received by said head are chosen from the group: synchronous and asynchronous.

22. The handheld optical leak detection instrument in accordance with claim 15, wherein said electromagnetic source comprises at least one from the group: a laser, a light emitting diode, an incandescent lamp, a chopped emitter, and a communication signal.

23. The handheld optical leak detection instrument in accordance with claim 15, further comprising:
   d) a detection indicator for alerting a user of presence of said received electromagnetic signal, said detection indicator comprising at least one of the group: visible indicator, audible indicator, and tactile indicator.

24. The handheld optical leak detection instrument in accordance with claim 15, further comprising:
   d) filtering means disposed in said head.

25. The handheld optical leak detection instrument in accordance with claim 15, wherein said means for generating an electromagnetic signal and interfacing with an optical fiber under test is disposed in a single physical package.

26. A handheld optical leak detection instrument comprising:
   a) a longitudinal frame having a proximal end and a distal end;
   b) means proximate said proximal end of said frame for interfacing with an optical fiber under test; and
   c) a head attached to said distal end of said frame for receiving an electromagnetic signal, said head being operatively connected to said means for interfacing with an optical fiber under test.

27. The handheld optical leak detection instrument in accordance with claim 26, further comprising:
   d) switching means for initiating propagation of said electromagnetic signal.

28. The handheld optical leak detection instrument in accordance with claim 26, further comprising:
   d) a handle connected to said frame.

29. The handheld optical leak detection instrument in accordance with claim 28, further comprising:
   e) a power source disposed in said handle.

30. The handheld optical leak detection instrument in accordance with claim 28, wherein said handle has a configuration being one of: cylindrical and tapered.

31. The handheld optical leak detection instrument in accordance with claim 26, wherein said head is interchangeable.

32. The handheld optical leak detection instrument in accordance with claim 26, wherein said electromagnetic signal is generated by at least one from the group: a laser, a light emitting diode, an incandescent lamp, a chopped emitter, and a communication signal.

33. The handheld optical leak detection instrument in accordance with claim 26, further comprising:
- d) a detection indicator for alerting a user of presence of said received electromagnetic signal, said detection indicator comprising at least one of the group: visible indicator, audible indicator, and tactile indicator.

34. The handheld optical leak detection instrument in accordance with claim 26, further comprising:
- d) filtering means disposed in said head.

35. The handheld optical leak detection instrument in accordance with claim 26, wherein said electromagnetic signal generated by at least one from the group: a laser, a light emitting diode, an incandescent lamp, a chopped emitter, and a communication signal, and said electromagnetic signal received by said head are chosen from the group: synchronous and asynchronous.

* * * * *